No. 643,421. Patented Feb. 13, 1900.
C. L. V. MUNDHENK.
AIR BRAKE.
(Application filed Mar. 10, 1898.)

(No Model.) 2 Sheets—Sheet 1.

Witnesses:

C. L. V. Mundhenk,
Inventor:
By R. J. McCarty,
his Attorney.

THE NORRIS PETERS CO., PHOTO-LITHO., WASHINGTON, D. C.

No. 643,421. Patented Feb. 13, 1900.
C. L. V. MUNDHENK.
AIR BRAKE.
(Application filed Mar. 10, 1898.)

(No Model.) 2 Sheets—Sheet 2.

UNITED STATES PATENT OFFICE.

CLEMENT L. V. MUNDHENK, OF GORDON, OHIO.

AIR-BRAKE.

SPECIFICATION forming part of Letters Patent No. 643,421, dated February 13, 1900.

Application filed March 10, 1898. Serial No. 673,333. (No model.)

*To all whom it may concern:*

Be it known that I, CLEMENT L. V. MUNDHENK, a citizen of the United States, residing at Gordon, in the county of Darke and State of Ohio, have invented certain new and useful Improvements in Air-Brakes; and I do hereby declare that the following is a full, clear, and exact description of the invention, which will enable others skilled in the art to which it appertains to make and use the same, reference being had to the accompanying drawings, and to the figures of reference marked thereon, which form a part of this specification.

My invention relates to improvements in air-brakes for railway-cars; and it consists of certain mechanism hereinafter described and claimed.

Figure 2:
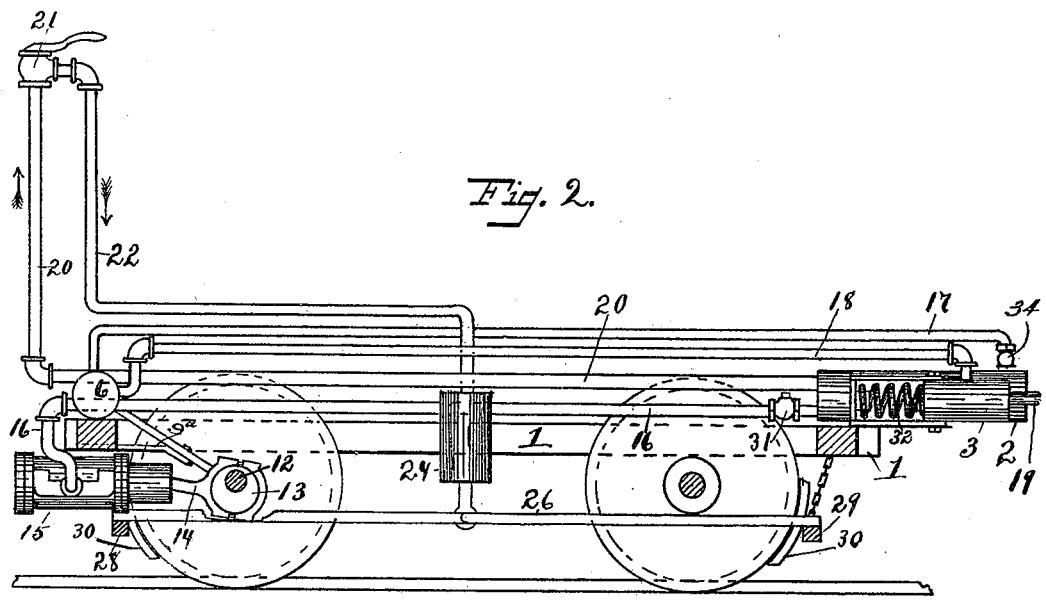
Figure 1:
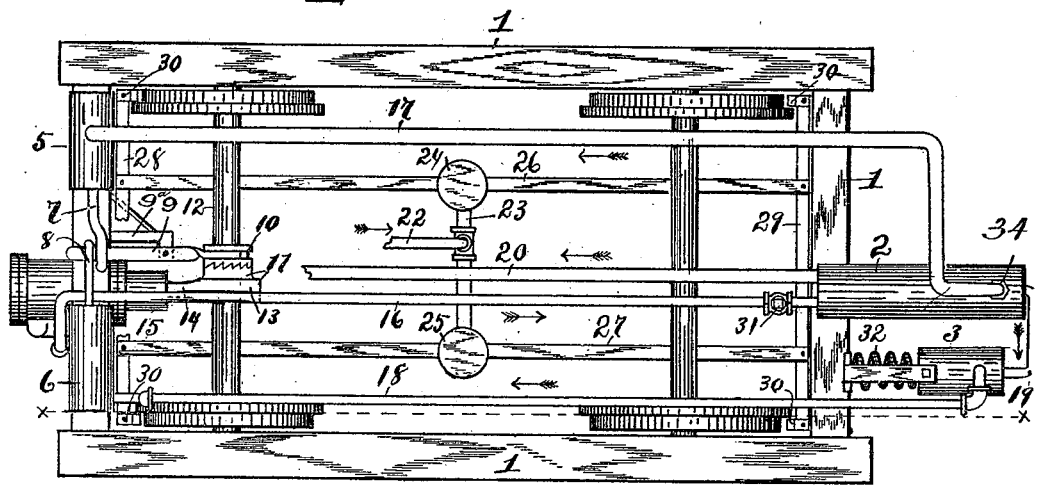
Figure 3:
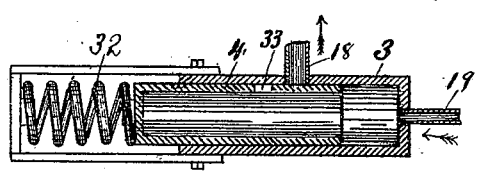
Figure 5:
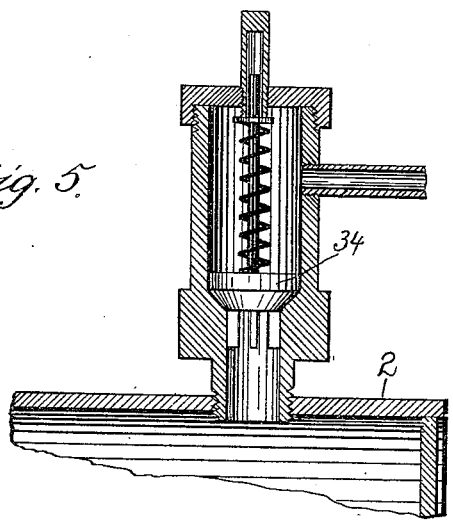
Figure 4:
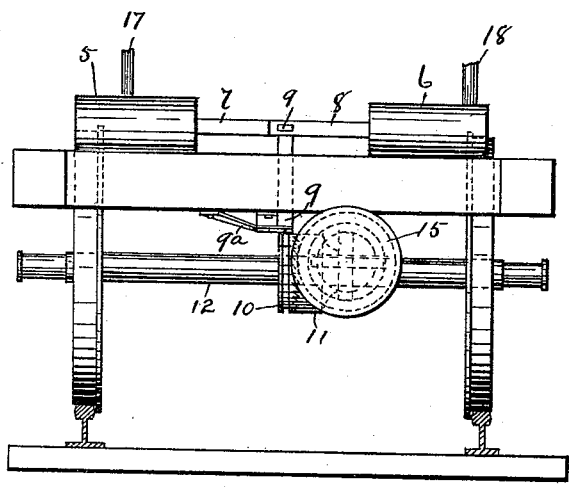

Referring to the annexed drawings, Figure 1 is a plan view of a car-truck upon which my air-brake mechanism is placed. Fig. 2 is a side sectional elevation on the line $x\,x$ of Fig. 1 with the wheels on one side removed. Fig. 3 is an enlarged longitudinal sectional view of the governing device. Fig. 4 is a front elevation of the truck. Fig. 5 is an enlarged sectional view of the blow-off valve.

Similar reference characters indicate corresponding parts in the several views.

The truck 1 may be of any of the common forms, and the various parts of the mechanism may be placed or located in a manner most convenient. The main air-reservoir 2 is suitably mounted at any point beneath the car, and the governing device, comprising cylinder 3, in which a slide-valve 4 is inclosed, is likewise suitably mounted, in the present instance on an end of the truck.

5 and 6 designate, respectively, two piston-cylinders, which are also mounted on the truck, and 7 and 8 are piston-rods that are connected to a shifting lever 9, which controls the sliding movement of the clutch member 10 to engage and release the loose clutch member 11, both of said clutch members being on one of the axles 12. The shifting lever 9 is fulcrumed on a support 9ª, that is suitably mounted, in the present instance on the front cross-piece of the truck-frame.

13 is an eccentric that is one piece with the loose clutch member 11 and to which a piston-rod 14 is strapped, the said rod moving a piston in an air-cylinder 15 to supply the air-reservoir 2 with air through a pipe 16 at stated times, as will hereinafter appear.

The cylinders 5 and 6 communicate, respectively, with the main air-reservoir 2 and the valve-cylinder 3 through pipes 17 and 18, the said valve-cylinder receiving air from the reservoir 2 through pipe 19. It will be seen that the purposes and objects of the cylinders 5 and 6 and their pistons are to throw the clutch members 10 and 11 in and out of gear.

20 is a pipe running from the reservoir 2 to an engineer's valve 21, located within hand reach of the engineer or other person applying the brakes. 22 is a down-pipe from said valve 21 to a cross-pipe 23, that communicates with upright piston-cylinders 24 and 25, the piston-rods of which are connected to the centers of bars 26 and 27, that are connected to the cross-beams 28 and 29. The brake-shoes 30 are attached to said beams. The pipe 16 has a check-valve 31, closing the passage from the reservoir to the pump 15. The pressure in the reservoir 2 is never lower than is sufficient to apply the brakes when the valve 21 is turned to admit air from pipe 20 to the down-pipe 22, and thence to the cylinders 24 and 25 to elevate the pistons therein and apply the brakes. The pressure in the reservoir 2 is maintained at a given degree—say sixty pounds. With this pressure the slide-valve 4 is held out against the pressure of the coil-spring 32 and in a position with the port 33 away from the pipe 18. When the pressure decreases sufficiently to make it less than the pressure of said spring 32, the latter moves the valve out to a position in which the port 33 registers with said pipe 18. Sufficient air is then admitted to the cylinder 6 to actuate the piston therein to draw the lever 9 in the direction to engage the clutch members 10 and 11. This sets the pump 15 in motion, and air is pumped into the reservoir 2 until the pressure therein is up to the normal, which again moves the valve 4 to a position to close the passage through the pipe 18. At this pressure of air in the cylinder it is sufficient to open a blow-off valve 34 in pipe 17. Air is then admitted to the cylinder 5 to actuate the piston therein to move the lever 9 to disconnect the clutch members. This stops the operation of the pump. The pressure of air in the pipe 20 is the same as that in the reservoir 2, and this pressure is transmitted to elevate the brake-beams to apply the brakes, as hereinbefore described.

Having described my invention, I claim—

1. In an air-brake mechanism, the combination with an air-reservoir, and a pump to supply the same with air, of a clutch mechanism geared to the piston of said pump, air-cylinders 5 and 6 with pistons moving therein the said pistons being connected to the shifting lever of said clutch mechanism, and which are adapted to throw said clutch mechanism in and out of gear, an auxiliary spring-controlled slide-valve communicating with the air-reservoir and controlling the passage from the said air-reservoir to the cylinder 6, a blow-off valve controlling the passage to the cylinder 5 from the air-reservoir, two piston-cylinders 25 and 26 supplied with air from said air-reservoir, parallel bars supporting the brake-beams and to which the pistons of cylinders 25 and 26 are connected, and a hand-valve controlling the passage of air from the air-reservoir to said cylinders 25 and 26 all arranged substantially as shown and described.

2. An air-brake mechanism, comprising in combination, a main air-reservoir 2, an auxiliary cylinder 3 supplied with air therefrom, a slide-valve in said auxiliary cylinder, a spring controlling the movement of said valve when the pressure in the reservoir 2 is less than the pressure of said spring, a pump to supply the air-reservoir with air, clutch mechanism geared to said pump and adapted to be actuated from one of the axles of the truck, piston-cylinders 5 and 6 with pistons therein connected to said clutch mechanism and adapted to throw the same in and out of gear, pipes 17 and 18 leading from the air-reservoir 2 and the cylinder 3 and through which said cylinders 5 and 6 are supplied with air, the former when the pressure in the reservoir is normal, and the latter when the pressure in said reservoir is less than normal, two side cylinders 25 and 26, a cross-pipe connecting said cylinders, valve-controlled pipes between said air-reservoir and the cross-pipe, and parallel bars connecting the brake-beams and to which the pistons of the cylinders 25 and 26 are connected, all arranged and operating substantially as and for the purposes specified.

In testimony that I claim the foregoing as my own I hereto affix my signature in presence of two witnesses.

CLEMENT L. V. MUNDHENK.

Witnesses:
W. B. NEVIN,
R. J. MCCARTY.